United States Patent
Beuterbaugh et al.

(10) Patent No.: US 10,487,261 B2
(45) Date of Patent: Nov. 26, 2019

(54) MULTIFUNCTIONAL SOLID PARTICULATE DIVERTING AGENT

(71) Applicant: Halliburton Energy Services, Inc., Houston, TX (US)

(72) Inventors: Aaron M. Beuterbaugh, Spring, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/066,545

(22) PCT Filed: Mar. 29, 2016

(86) PCT No.: PCT/US2016/024762
§ 371 (c)(1),
(2) Date: Jun. 27, 2018

(87) PCT Pub. No.: WO2017/171731
PCT Pub. Date: Oct. 5, 2017

(65) Prior Publication Data
US 2019/0016948 A1    Jan. 17, 2019

(51) Int. Cl.
*E21B 43/26* (2006.01)
*C09K 8/74* (2006.01)
(Continued)

(52) U.S. Cl.
CPC ............... *C09K 8/74* (2013.01); *C09K 8/601* (2013.01); *C09K 8/68* (2013.01); *C09K 8/70* (2013.01); *E21B 33/138* (2013.01); *E21B 43/26* (2013.01)

(58) Field of Classification Search
CPC ...... C09K 8/528; C09K 8/92; C09K 2208/10; C09K 8/805; E21B 43/267; E21B 43/26
See application file for complete search history.

(56) References Cited

U.S. PATENT DOCUMENTS

| 7,036,587 B2 | 5/2006 | Munoz, Jr. et al. |
| 8,183,179 B2 | 5/2012 | Garcia-Lopez de Victoria et al. |

(Continued)

FOREIGN PATENT DOCUMENTS

| BR | PI0823508 A2 | 10/2013 |
| WO | 2009/016549 A2 | 2/2009 |

(Continued)

OTHER PUBLICATIONS

International Search Report and Written Opinion issued in related PCT Application No. PCT/US2016/024762 dated Dec. 28, 2016, 10 pages.

(Continued)

*Primary Examiner* — Zakiya W Bates
(74) *Attorney, Agent, or Firm* — Thomas Rooney; Baker Botts L.L.P.

(57) ABSTRACT

Systems and methods for treating subterranean formations using solid particulates comprising compounds having an aminopolycarboxylic functional group and a phosphoric acid functional group. In one embodiment, the methods comprise: providing a treatment fluid comprising a base fluid and a plurality of solid particulates, wherein the solid particulates comprise at least one compound having an aminocarboxylic functional group and a phosphonic functional group, and wherein the solid particulates have a diameter from about 0.1 microns to about 5 millimeters; and introducing the fluid into a wellbore penetrating a portion of a subterranean formation at a rate and pressure sufficient to create or enhance one or more fractures in the subterranean formation.

20 Claims, 2 Drawing Sheets

(51) Int. Cl.
*C09K 8/70* (2006.01)
*C09K 8/60* (2006.01)
*C09K 8/68* (2006.01)
*E21B 33/138* (2006.01)

(56) References Cited

U.S. PATENT DOCUMENTS

| | | |
|---|---|---|
| 8,697,612 B2 | 4/2014 | Todd et al. |
| 8,853,137 B2 | 10/2014 | Todd et al. |
| 2005/0167105 A1 | 8/2005 | Roddy et al. |
| 2009/0025933 A1 | 1/2009 | Garcia-Lopez de Victoria et al. |
| 2009/0038799 A1 | 2/2009 | Garcia-Lopez de Victoria et al. |
| 2011/0005760 A1 | 1/2011 | Hartman et al. |
| 2011/0028358 A1 | 2/2011 | Welton et al. |
| 2011/0105368 A1* | 5/2011 | Welton .................... C04B 18/02 507/237 |
| 2011/0127039 A1 | 6/2011 | Garcia-Lopez de Victoria et al. |
| 2011/0168395 A1 | 7/2011 | Welton et al. |
| 2014/0374107 A1 | 12/2014 | Reyes et al. |
| 2016/0075941 A1* | 3/2016 | Duenckel ............... C09K 8/805 166/280.2 |

FOREIGN PATENT DOCUMENTS

| | | |
|---|---|---|
| WO | 2015/041669 A1 | 3/2015 |
| WO | 2015/041678 A1 | 3/2015 |
| WO | 2015/088561 A1 | 6/2015 |

OTHER PUBLICATIONS

Beuterbaugh, Aaron M., Enrique A. Reyes, and Alyssa L. Smith. "Tandem Acidizing-Corrosion Inhibition with Low Risk-Low Toxicity Chelant." SPE International Symposium on Oilfield Chemistry. Society of Petroleum Engineers, 2015.

* cited by examiner

MULTIFUNCTIONAL SOLID PARTICULATE DIVERTING AGENT

CROSS-REFERENCE TO RELATED APPLICATION

The present application is a U.S. National Stage Application of International Application No. PCT/US2016/024762 filed Mar. 29, 2016, which is incorporated herein by reference in its entirety for all purposes.

BACKGROUND

The present disclosure relates to systems and methods for treating subterranean formations with particulate diverting agents.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

In hydraulic fracturing treatments, a fracturing fluid is injected through a wellbore into the surrounding formation at a sufficient pressure to fracture the formation adjacent to the wellbore, creating a fracture network for fluid to flow through the formation back to the wellbore. This generally stimulates the flow of fluids (e.g., hydrocarbon fluids) from the formation into the wellbore.

Generally, fracturing treatment in a rock formation can create long and continuous dominant fractures placed on opposing sides of the wellbore, e.g., a bi-wing type fracture. However, it may not be feasible to create such fractures in many carboniferous shale formations. These shale formations typically have finely laminated structures that are easily fragmented or disjointed into randomly distributed pieces. Therefore, creating an effective fracture network in these formations can be an issue.

Efforts have been made to increase shattering or splintering of the formations and overall connectivity of the fracture network. For example, diverting agents, such as particulate materials, have been used to block larger fractures, or zones of higher permeability, in a formation in order to attempt to level the permeability of the formation to a nearly uniform state. However, using these diverting techniques often have additional costs.

BRIEF DESCRIPTION OF THE DRAWINGS

These drawings illustrate certain aspects of some of the embodiments of the present disclosure, and should not be used to limit or define the claims.

Figure 1:
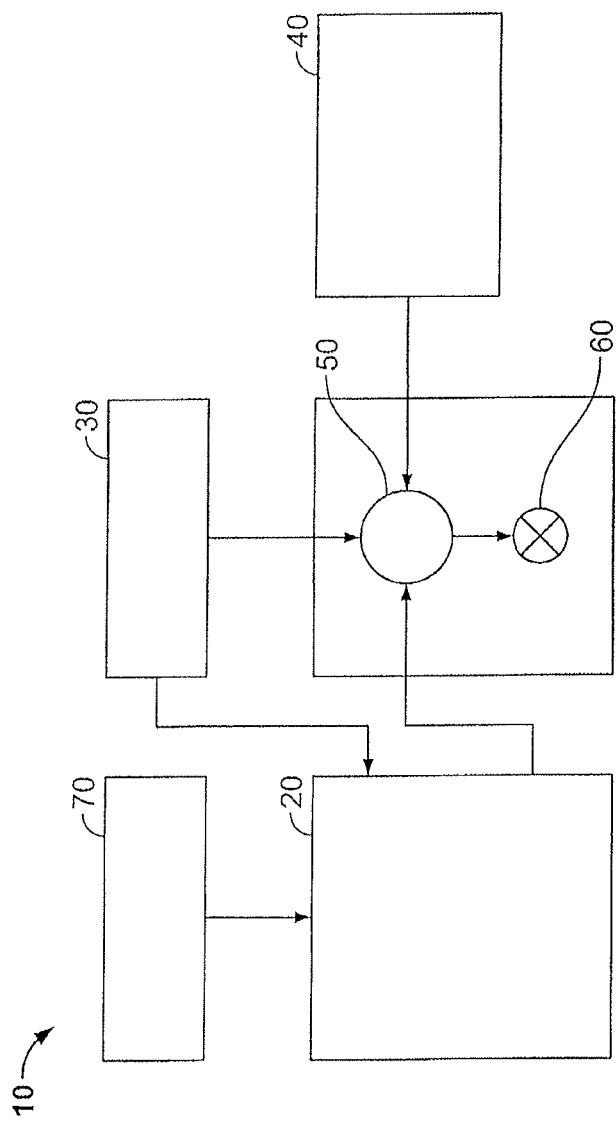
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for using treatment fluids comprising certain types of solid particulates as a diverting agent in a subterranean formation.

The present disclosure provides methods and systems for treating a subterranean formation using a treatment fluid comprising a plurality of solid particulates, wherein the solid particulates comprise at least one compound having at least one aminopolycarboxylic acid functional group and at least one phosphonic acid functional group. In certain embodiments, the methods of the present disclosure comprise: providing a treatment fluid comprising a plurality of solid particulates wherein the solid particulates have a diameter of from about 0.1 microns to about 5 millimeters and wherein the solid particulates comprise at least one compound having at least one aminopolycarboxylic acid functional group and at least one phosphonic acid functional group; and introducing the treatment fluid into a wellbore that penetrates at least a portion of a subterranean formation at a rate and pressure sufficient to create or enhance one or more fractures in the subterranean formation. In certain embodiments, the methods of the present disclosure comprise: providing a treatment fluid comprising solid particulates wherein the solid particulates comprise the phosphorylated aminocarboxylic acid known as N-phosphonomethyl iminodiacetic acid (PMIDA); and introducing the treatment fluid into a wellbore that penetrates at least a portion of a subterranean formation at a rate and pressure sufficient to create or enhance one or more fractures in the subterranean formation.

Without limiting the disclosure to any particular theory or mechanism, it is believed that particulates comprising phosphorylated aminocarboxylic acids may serve as multifunctional diverting agents, at least in part due to their unique chemistry. Phosphorylated aminocarboxylic acids are insoluble in low pH environments and are only appreciably soluble when deprotonated. In certain embodiments, when a phosphorylated aminocarboxylic acid is introduced into the subterranean formation in a slightly acidic base fluid, it will remain in the form of a solid particulate and may be able to function as a diverter. However, phosphorylated aminocarboxylic acids may be deprotonated in basic or neutral solutions, which may make them more soluble and thus readily removable from subterranean formations with a neutral or basic treatment fluid.

In certain embodiments, the acidic nature of phosphorylated aminocarboxylic acids may allow the compounds to react with certain components of a subterranean formations (e.g., carbonates) in the same manner as that of an etching or acidizing fluid. Thus, in some embodiments, the particulates comprising phosphorylated aminocarboxylic acids of the present disclosure may act not only as diverting agents but also as an acidizing or etching agents.

Additionally, in some embodiments, phosphorylated aminocarboxylic acids may exhibit chelation characteristics. In some instances, phosphorylated aminocarboxylic acids react with free metal ions to stop them from precipitating out of solution, which may be particularly advantageous in treatments of subterranean formations, as precipitated metals can lead to plugging of proppant packs, surface production equipment, and fracture faces and/or surfaces that were created in a stimulation treatment. This chelation characteristic also may be beneficial in stimulation treatments, as the chelation of the free metal ions created by the stimulation treatments may prevent the ions from precipitating and causing the aforementioned problems.

Furthermore, phosphorylated aminocarboxylic acids are also capable of interacting with crosslinked additives such as crosslinked polymeric gelling agents and thermoplastics that are sometimes used as viscosifying agents. In some cases, phosphorylated aminocarboxylic acids degrade these polymers or disrupt the crosslinking reaction. Thus, in some embodiments, phosphorylated aminocarboxylic acids can be used as fluid breakers to reduce fluid viscosity by degrading the aforementioned polymers.

Among the many potential advantages to the methods and compositions of the present disclosure, only some of which are alluded to herein, the methods, compositions, and systems of the present disclosure provide a diverting agent which may be a biodegradable and readily removable from a subterranean formation. The present disclosure also provides a multifunctional diverting agent which may etch or dissolve a portion of a subterranean formation, which may increase the permeability of the formation and/or a proppant pack therein. In certain embodiments, the treatment fluids of the present disclosure also may provide a method for reducing the viscosity of a crosslinked fluid and aiding in flowback of the fluid by acting as a fluid breaker or a viscosity reducing agent. In certain embodiments, the treatment fluids of the present disclosure also may provide an agent control of heavy metal ions (e.g., iron, zinc, zirconium, and aluminum ions) in downhole fluids. In certain embodiments, the treatment fluids of the present disclosure may also provide scale dissolution agents with respect to, for example, calcium sulfate and calcium carbonate. The treatment fluids of the present disclosure also may provide a method for minimizing or eliminating the risk of precipitation by sequestering or chelating dissolved metals. Furthermore, the present disclosure provides a diverting agent that may be environmentally friendly and relatively non-toxic.

The treatment fluids (e.g., fracturing fluids) used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. In certain embodiments, the pH of the base fluid is less than about 4.8. In certain embodiments, the pH of the base fluid is less than about 4. In certain embodiments, the pH of the base fluid is less than about 2.5, or less than about 1. In certain embodiments, the base fluid may be substantially free of any other acid or acid generating compounds (e.g., polylactic acid (PLA), mineral acids, organic acids, inorganic acids, or other acids, including delayed release acids) other than the solid particulate. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, nitrogen ($N_2$), carbon dioxide ($CO_2$), hydrocarbons, organic liquids, and the like. In certain embodiments, the treatment fluids may comprise a mixture of one or more fluids and/or gases, including but not limited to emulsions, foams, and the like.

In the methods and compositions of the present disclosure, the solid particulates comprise at least one compound that includes at least one aminopolycarboxylic acid functional group and at least one phosphonic acid functional group. In certain embodiments, the solid particulate may comprise any combination of one or more compounds that include at least one aminopolycarboxylic acid functional group and at least one phosphonic acid functional group. In certain embodiments, the solid particulate consists of one or more phosphorylated aminocarboxylic acids. According to certain embodiments, the solid particulate comprises N-phosphonomethyl iminodiacetic acid (PMIDA), which has such structure as Formula I below.

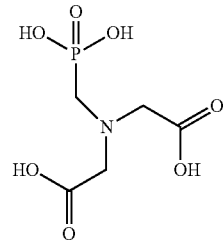

Formula I

PMIDA is an agrochemical precursor and is primarily used as an intermediary to produce the broad-spectrum herbicide glyphosphate. In some embodiments, the solid particulates may comprise phosphono(amino-carboxylic) acids such as N,N-bis(phosphonomethyl)glycine. In certain embodiments, the solid particulates may comprise one or more diphosphonic and aminophosphonic acids that remain substantially undissolved in the fluids of the present disclosure. Representative examples of such compounds that may be used include, but are not limited to, phosphonobutane-1,2, 4-tricarboxylic acid, iminobis(methylenephosphonic acid), and nitrilotris(methylene phosphonic acid).

It should be understood that the term "particulate," as used in this disclosure, includes all known shapes of materials, including substantially spherical materials, pellets, flattened pellets, flakes, polygonal materials (such as cubic materials), and mixtures thereof. It should be understood that the term "particulate" as used in this disclosure includes all known sizes of materials having diameters ranging from about 0.1 microns up to about 5 millimeters. In certain embodiments, the diameters of the solid particulates range from about 5 microns to 200 microns. The particle size distribution of the solid particulates of the present disclosure may be monomodal or multi-modal (e.g., bimodal, trimodal, etc.), and may have any range, percentage, or concentration of particle size distribution. In certain embodiments, the solid particulates may be "shapeable" in that they may comprise smaller particles agglomerated together to form flakes and/or pellets. A person skilled in the art, with the benefit of this disclosure, will recognize that the types, sizes, and shapes of particles that may be used in the fluids of the present disclosure for a particular application. For example, the size of the solid particles appropriate for a particular use in a subterranean formation may depend on the size of the particle needed to act as a diverting agent or bridging agent. In certain embodiments, this may depend on, among other factors, the pore throat size, fracture width, and/or other characteristics of the subterranean formation.

The particulate may be present in the treatment fluids useful in the methods of the present invention in an amount sufficient to provide the desired functionality. In some embodiments, the particulates may be present in an amount in the range of from about 0.05% by weight of the treatment fluid to about 25% by weight of the treatment fluid. In certain embodiments, the solid particulate may be present in an amount in the range of from about 0.25% by weight of the treatment fluid to about 2% by weight of the treatment fluid.

In certain embodiments, the treatment fluid may contain a gelling agent, also known as a viscosifying agent. As used herein, the term "viscosifying agent" refers to a material capable of forming the fracturing fluid into a gel, thereby increasing its viscosity. Viscosifying agents and their derivatives include semi-solid, jelly-like states assumed by some colloidal dispersions. In certain embodiments, the viscosifying agent may comprise one or more polymers that have at least two molecules that are capable of forming a crosslink in a crosslinking reaction in the presence of a suitable crosslinking agent, and/or polymers that have at least two molecules that are so crosslinked (i.e., a crosslinked viscosifying agent). The viscosifying agents may be naturally occurring viscosifying agents, synthetic viscosifying agents, or a combination thereof. The viscosifying agents also may be cationic viscosifying agents, anionic viscosifying agents, or a combination thereof.

Examples of viscosifying agents that may be suitable for use in certain embodiments of the present disclosure include, but are not limited to, natural or derivatized compounds that are soluble, dispersible, or swellable in an aqueous liquid. Examples include modified celluloses and derivatives thereof, and biopolymers and derivatives thereof other examples include polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), locust bean gums, gum ghattis, gum karayas, tamarind gums, and tragacanth gums; depolymerized gums such as depolymerized guar gum, and derivatives thereof; cellulose derivatives (e.g., hydroxyethyl cellulose, methylcellulose carboxyethylcellulose, carboxymethylcellulose, and carboxymethylhydroxyethylcellulose), xanthan, scleroglucan, succinoglycan, diutan, derivatives thereof, copolymers thereof, and combinations thereof. In certain embodiments, the viscosifying agent may comprise a derivatized cellulose that comprises cellulose grafted with an allyl or a vinyl monomer. Examples of synthetic polymer viscosifying agents include, but are not limited to, acrylate/methacrylate/vinyl phosphate containing acrylamide copolymers, derivatives thereof, copolymers thereof, and combinations thereof. In certain embodiments, one or more viscosifying agents may be present in the treatment fluid of this disclosure. As discussed below, in certain embodiments, the treatment fluid comprising one or more such viscosifying agents may be are separated from the treatment fluids of this disclosure by a spacer fluid.

The viscosifying agent may be present in the treatment fluids useful in the methods of the present invention in an amount sufficient to provide the desired viscosity. In some embodiments, the viscosifying agents (e.g., the polymeric material) may be present in an amount in the range of from about 0.1% to about 10% by weight of the treatment fluid. In certain embodiments, the viscosifying agents may be present in an amount in the range of from about 0.15% to about 2.5% by weight of the treatment fluid. However, in certain embodiments, the treatment fluids of the present disclosure may not comprise a significant amount of a viscosifying agent. In these embodiments, the treatment fluids of the present disclosure may be characterized as "slickwater" treatment fluids. In certain embodiments, such "slickwater" treatment fluids may comprise one or more other optional additives, as described below.

In certain embodiments, the treatment fluids used in the methods and systems of the present disclosure optionally may comprise any number of additional additives. Examples of such additional additives include, but are not limited to, salts, surfactants, acids, proppant particulates, additional diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, additional viscosifiers, crosslinking agents, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the solid particulate and/or other components of the treatment fluid may be metered directly into a base treatment fluid to form a treatment fluid. In certain embodiments, the base fluid may be mixed with the solid particulate and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, a spacer fluid optionally may be introduced into the subterranean formation before and/or after a treatment fluid of the present disclosure. Spacer fluids may be used to separate two fluids (e.g., two other wellbore servicing fluids) from one another, due to a specialized purpose for the separated fluids, a possibility of contamination, incompatibility (e.g., chemically), or combinations thereof. For example, a spacer fluid (e.g., an aqueous fluid such as water) may be used to separate a crosslinked fracturing fluid and a treatment fluid of this disclosure, among other reasons, to prevent the compound comprising the aminopolycarboxylic functional group and a phosphonic acid functional group from interfering with the crosslinking interaction.

In some embodiments, the treatment fluid further may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (for example, in acidizing and/or etching treatments). Introduction of the treatment fluid may in some of these embodiments be carried out at or above a pressure sufficient to create or enhance one or more fractures within the subterranean formation (e.g., hydraulic fracturing or fracture acidizing). In other embodiments, introduction of the treatment fluid may be carried out at a pressure below that which would create or enhance one or more fractures within the subterranean formation (e.g., matrix acidizing).

In some embodiments of the present disclosure, the solid particulates act as particulate diverting agents or bridging agents. In some embodiments, these particulate diverting agents or bridging agents form a filter cake. In a subterranean formation, a bridging agent or diverting agent can be used to at least partially bridge or block off one or more perforations, pore throats, fractures, or flow pathways, among other reasons, to control which zone is preferentially fractured, divert fluid flow to another region in the formation and/or to prevent loss of fracturing or treatment fluid. In some methods of the present disclosure, the solid particulates acting as particulate diverting agents or bridging agents can be removed from the subterranean formation after their use as such. In certain embodiments, the particulate may be removed from the subterranean formation by contacting the particulate with a basic fluid, a neutral pH fluid, and/or produced water which may cause the particulate to at least partially dissolve into the fluid.

In certain embodiments of the present disclosure, the treatment fluid acts as a breaker fluid, reducing the viscosity of another fluid disposed in the subterranean formation and aiding in flow back of the other fluid. In certain embodiments of the present disclosure, the treatment fluid acts as a breaker fluid for cross linked acrylamides or any other thermoplastics disposed in the subterranean formation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation m which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
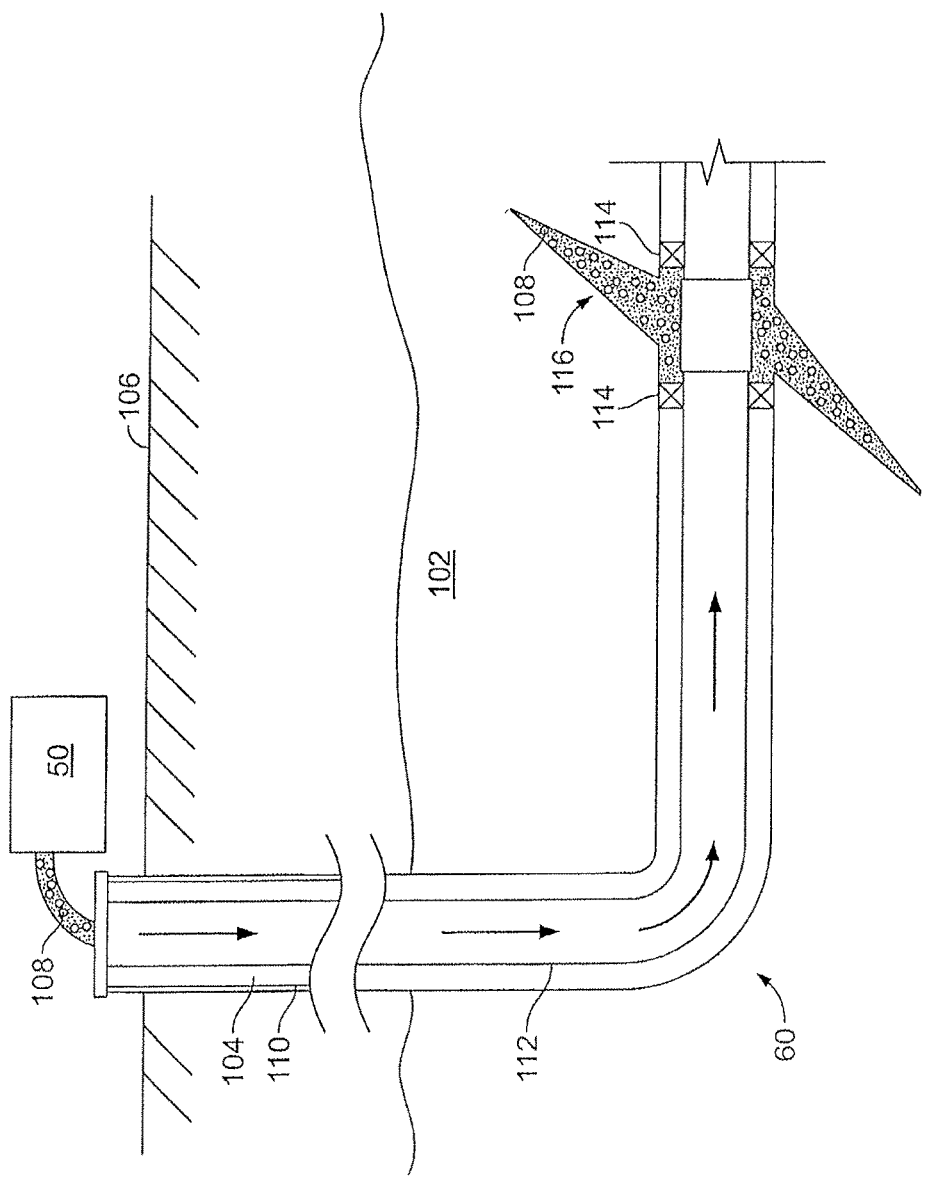
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be forming in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone I 02. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: providing a treatment fluid comprising a base fluid and a plurality of solid particulates, wherein the solid particulates comprise at least one compound having an aminocarboxylic functional group and a phosphonic functional group, and wherein the solid particulates have a diameter of from about 0.1 microns to about 5 millimeters; and introducing the fluid into a wellbore penetrating a portion of a subterranean formation at a rate and pressure sufficient to create or enhance one or more fractures in the subterranean formation.

Another embodiment of the present disclosure is a method comprising: providing a treatment fluid comprising an aqueous base fluid and a plurality of solid particulates, wherein the solid particulates comprise N-phosphonomethyl iminodiacetic acid and wherein the solid particulates have a diameter from about 0.1 microns to about 200 microns; and introducing the fluid into a wellbore penetrating a portion of a subterranean formation at a rate and pressure sufficient to create one or more fractures therein.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing a treatment fluid comprising a base fluid and a plurality of solid particulates, wherein the solid particulates comprise at least one compound having an aminopolycarboxylic functional group and a phosphoric acid functional group, wherein the treatment fluid has a pH of less than about 4.8, and wherein the solid particulates have a diameter of from about 0.1 microns to about 5 millimeters;
    introducing the fluid into a wellbore penetrating a portion of a subterranean formation at a rate and pressure sufficient to create or enhance one or more fractures in the subterranean formation; and
    allowing the solid particulates to at least partially block the portion of the subterranean formation to divert the flow of the fluid to another portion of the subterranean formation.

2. The method of claim 1 wherein the solid particulate comprises one or more phosphorylated aminocarboxylic acids.

3. The method of claim 1 wherein the solid particulates comprise at least one compound selected from the group consisting of: N,N-bis(phosphonomethyl)glycine; phosphonobutane-1,2,4-tricarboxylic acid, iminobis(methylenephosphonic acid), and nitrilotris(methylene phosphonic acid); and any combination thereof.

4. The method of claim 1 wherein the solid particulates comprise N-phosphonomethyl iminodiacetic acid.

5. The method of claim 1 wherein the solid particulates comprise agglomerated particles.

6. The method of claim 1 wherein the solid particulates have at least one shape selected from the group consisting of: a pellet, a flattened pellet, a flake, and any combination thereof.

7. The method of claim 1 wherein the solid particulates have a diameter from 5 microns to about 200 microns.

8. The method of claim 1 wherein the base fluid comprises an aqueous base fluid.

9. The method of claim 1 wherein the treatment fluid further comprises a viscosifying agent.

10. The method of claim 9 wherein the viscosifying agent further comprises a crosslinked viscosifying agent.

11. The method of claim 1 wherein the solid particulates are present in the treatment fluid in a concentration of from about 0.05% by weight of the treatment fluid to about 25% by weight of the treatment fluid.

12. The method of claim 1 wherein the method further comprises introducing a spacer fluid into the wellbore before introducing the treatment fluid into the wellbore.

13. The method of claim 1 wherein the method further comprises introducing a neutral or basic fluid into the wellbore after introducing the treatment fluid into the well bore.

14. The method of claim 1 wherein the method further comprises allowing the treatment fluid to be contacted by a flow of produced water.

15. The method of claim 1 wherein a viscosified fluid is present in the subterranean formation before introducing the treatment fluid into the well bore, and the method further comprises contacting the viscosified fluid with the treatment fluid to reduce the viscosity of the viscosified fluid.

16. The method of claim 1 wherein the method further comprises allowing the solid particulates to chelate with one or more metals present in the subterranean formation.

17. The method of claim 1 wherein providing the treatment fluid comprises mixing the treatment fluid using mixing equipment.

18. A method comprising:
providing a treatment fluid comprising an aqueous base fluid and a plurality of solid particulates, wherein the solid particulates comprise N-phosphonomethyl iminodiacetic acid, wherein the treatment fluid has a pH of less than about 4.8, and wherein the solid particulates have a diameter of from about 0.1 microns to about 200 microns;
introducing the fluid into a wellbore penetrating a portion of a subterranean formation at a rate and pressure sufficient to create or enhance one or more fractures therein; and
allowing the solid particulates to at least partially block the portion of the subterranean formation to divert the flow of the fluid to another portion of the subterranean formation.

19. The method of claim 18 wherein the method further comprises introducing a neutral or basic fluid into the wellbore after introducing the treatment fluid into the well bore.

20. The method of claim 18 wherein the method further comprises allowing the solid particulates to chelate with one or more metals present in the subterranean formation.

* * * * *